W. AND J. W. DAY.
REFRIGERATING APPARATUS.
APPLICATION FILED FEB. 23, 1921.

1,428,361.

Patented Sept. 5, 1922.
6 SHEETS—SHEET 1.

Inventors
Wallace Day
John Walter Day
By F. R. Cornwall Atty

W. AND J. W. DAY.
REFRIGERATING APPARATUS.
APPLICATION FILED FEB. 23, 1921.

1,428,361.

Patented Sept. 5, 1922.
6 SHEETS—SHEET 3.

Inventors
Wallace Day
John Walter Day

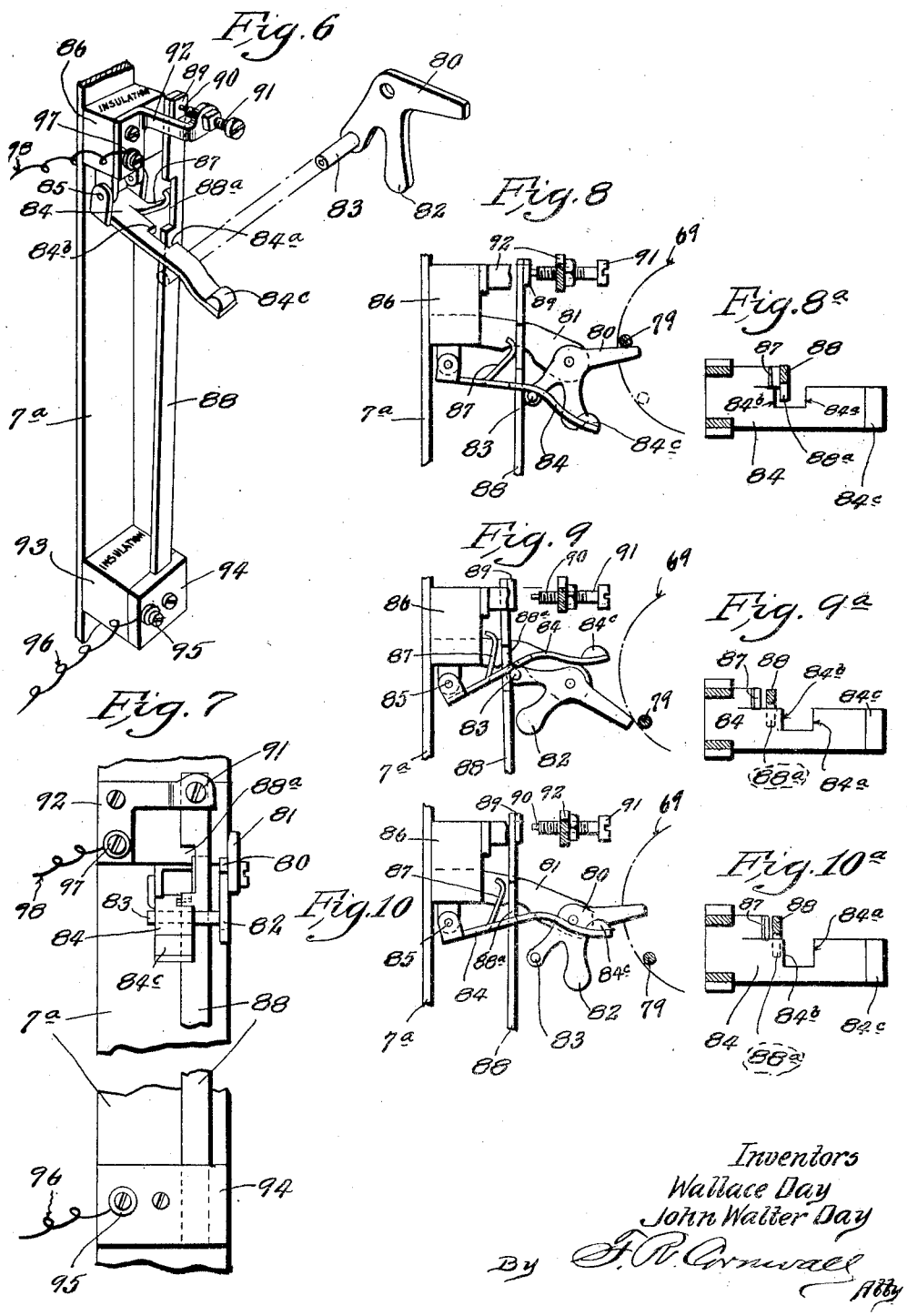

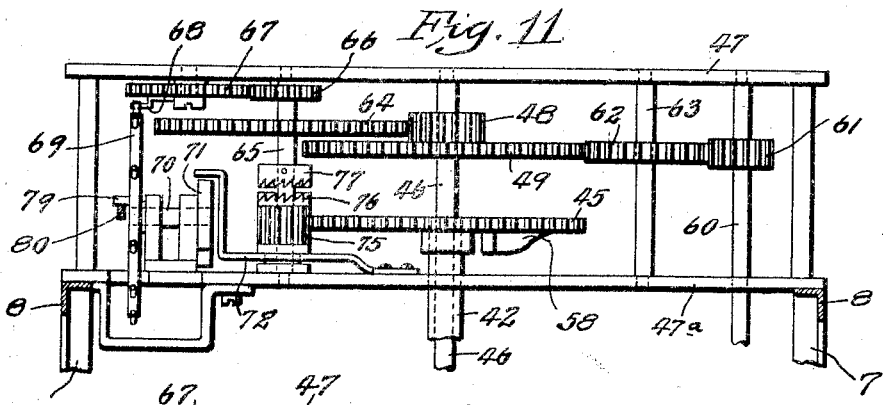
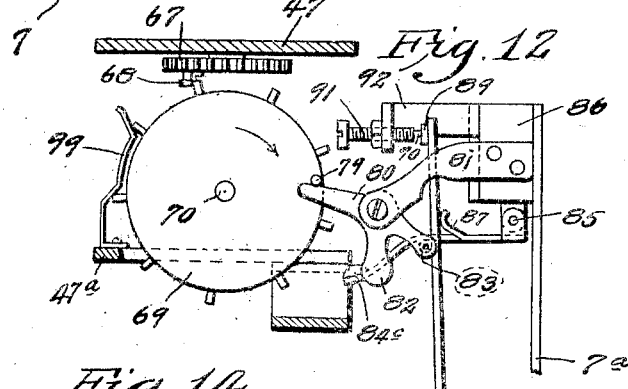
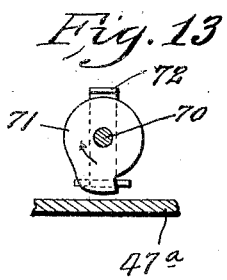
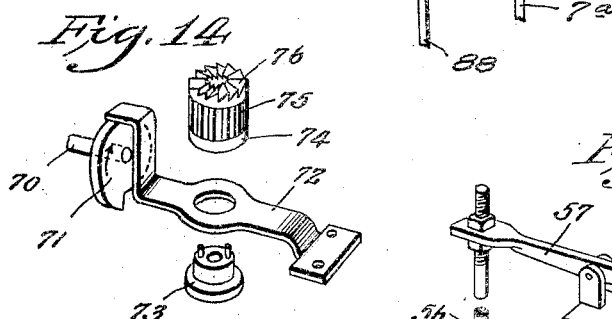
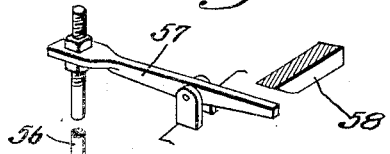
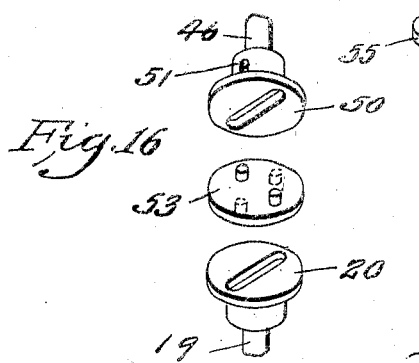

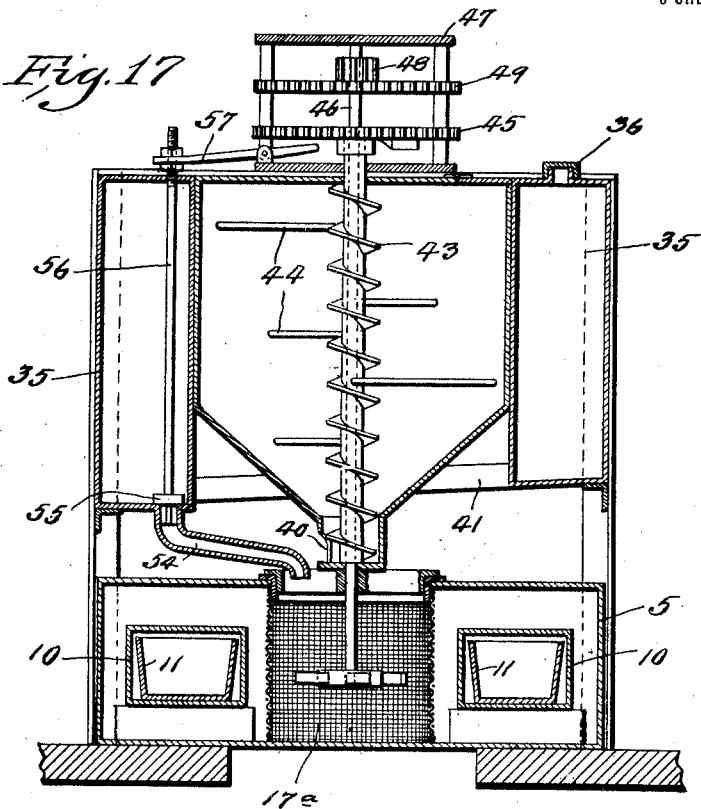
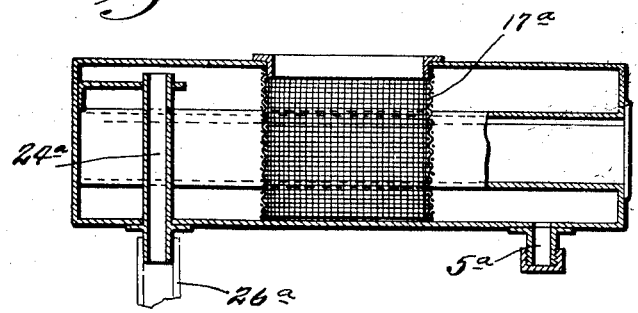

Patented Sept. 5, 1922.

1,428,361

UNITED STATES PATENT OFFICE.

WALLACE DAY AND JOHN WALTER DAY, OF MAPLEWOOD, MISSOURI, ASSIGNORS OF ONE-THIRD TO MILFRED L. GREENSTREET, OF MAPLEWOOD, MISSOURI.

REFRIGERATING APPARATUS.

Application filed February 23, 1921. Serial No. 447,125.

*To all whom it may concern:*

Be it known that we, WALLACE DAY and JOHN WALTER DAY, citizens of the United States, residing at Maplewood, St. Louis County, Missouri, have invented a certain new and useful Improvement in Refrigerating Apparatus, of which the following is a full, clear, and exact description, such as will enable others skilled in the art to which it appertains to make and use the same, reference being had to the accompanying drawings, forming part of this specification.

This invention relates to a new and useful improvement in method of and apparatus for refrigeration, the object being to construct an apparatus of the character described which will be automatically operated with the least amount of power, producing a degree of refrigeration in the refrigerating chamber as desired by predetermined adjustments of the parts.

While we have shown an apparatus in the accompanying drawings which is self-contained and designed to be placed in the ice chamber of an ordinary domestic refrigerator or ice-box, it is obvious that our invention is capable of use in larger appliances, such as cold storage warehouses, in refrigerator cars, water coolers, etc. We have found that nitrate of ammonia is a good refrigerant to employ, but we are aware that other chemicals may be used either in liquid form, lump form, powdered form, or tablets. Therefore, in referring to a "chemical" we do not wish to be limited to the granular form of nitrate of ammonia, for which we have heretofore expressed a preference.

We have also found that water can be advantageously employed with the refrigerant, but we do not wish to be limited to natural water, as certain ingredients may be combined therewith in solution, and which under certain conditions might assist in the absorption of heat. Mechanical means are provided, perferably operated by an electric motor or a spring motor, or power derived from other sources may be employed for the purpose of supplying a charge of liquid and chemical into a mixing pan where the same is agitated for the purpose of forming a refrigerating solution. The solution thus formed in the pan may overflow into a coil pipe and be finally discharged as waste, or the chemical in the solution may be recovered, but such forms no part of my present invention; or the solution may be used over again.

The charging of the bath in the refrigerating pan is controlled by mechanical means and occupies but a comparatively short space of time, the agitation of the bath, however, extends over a relatively longer period of time for the purpose of completely dissolving the chemical in the bath. At the end of this agitating operation, the current is shut off from the motor or the motor is disconnected from the driving train so that the refrigerant is given an opportunity to absorb the heat from the refrigerating chamber. The motor circuit is broken by a tappet operated by an intermittent mechanism driven from the motor circuit, and in breaking the motor circuit, this tappet stresses the thermostat bar and places a lever in position to be operated in stressing the bar in an opposite direction to close the circuit on a rising temperature. The charging of a chemical into the mixing pan, and the replenishing of a fresh supply of liquid therein produces a reduction of temperature in the refrigerating chamber with the result that the thermostat bar whose action is influenced by the temperature of the refrigerating chamber is held in a position to maintain the contacts open. When the heat units in the refrigerating chamber are absorbed by the refrigerant, the thermostat bar, on a rising temperature will start to move in an opposite direction, and will effect the release of the lever and close the motor circuit and stress the bar when said motor circuit is closed. Hence, when a predetermined high temperature is reached in the refrigerating chamber, the lever will be tripped so as to make contact and complete the current through the motor, thus starting the motor on another cycle of operations. The operation of the motor causes the intermittent movement of an element which will cooperate with said bar to open the motor circuit, but the motor circuit is closed by the influence of the rising temperature on said bar whenever that may occur.

During the operation of the motor a charge of fresh liquid and chemical is introduced into the bath and agitated. The refrigerant will now again reduce the temperature in the refrigerating chamber. The thermostat in this lowering temperature will set the lever in position to be tripped when the thermostat moves in an opposite direction in a rising temperature in the refrigerating chamber.

Other features of our invention will be more clearly set forth in the following description.

In the accompanying drawings forming part of of this application, and in which like figures refer to like parts wherever they occur, Figure 1 is a conventional illustration in vertical section of a domestic refrigerator showing our improved apparatus in position therein.

Figure 3a is a horizontal sectional view through one of the closed chambers showing the removable trough or drawer in position.

Figure 6 is a detail view of the thermostat and its connections.

Figure 7 is a front elevational view of said thermostat.

Figures 8, 9 and 10 are side elevational views of a tappet which cooperates with the thermostat.

Figure 1:
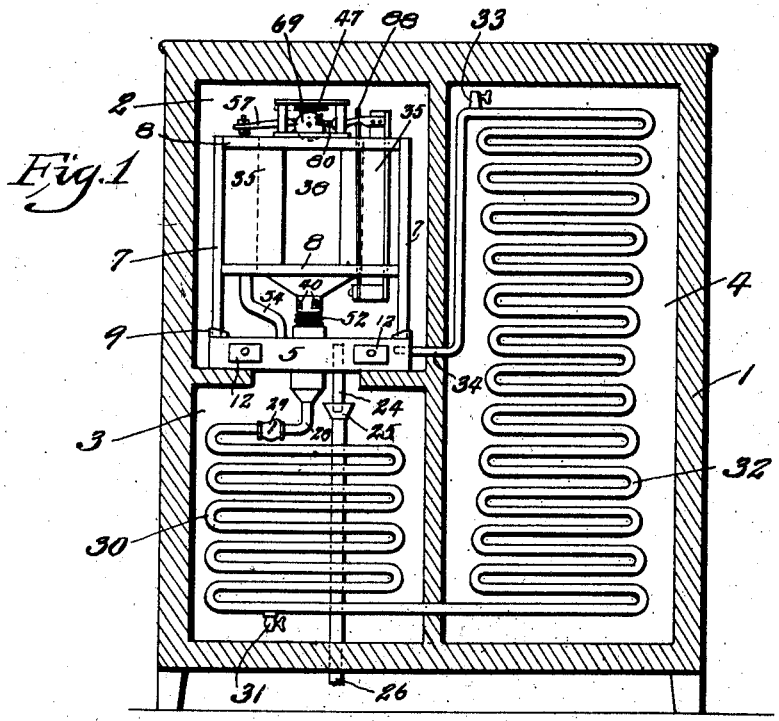

Figures 8a, 9a, and 10a are plan views partly in horizontal section showing different positions of the thermostat bar relative to the tappet actuated member.

Figure 11 is an elevational view of the power-driven train.

Figure 12 is a detail view of the intermittently driven wheel which operates the tappet.

Figure 13 is a detail view of the intermittently driven cam.

Figure 14 is a detail view of said cam and its cooperating clutch.

Figure 15 is a detail view of the valve operating lever.

Figure 16 is a detail view of a flexible coupling between the driven train and the agitator and propelling shaft.

Figure 17 is a vertical sectional view through a modified form of apparatus.

Figure 18 is a vertical sectional view through the mixing tank taken at right angles to the sectional view of said tank shown in Figure 17.

1 indicates the casing of an icebox or domestic refrigerator having the usual ice chamber 2 and compartments 3 and 4 in which foodstuffs and the like may be placed for preservation. We have shown our improved apparatus as a compact unit designed to be placed in the ice chamber of the refrigerator, this unit consisting of a mixing pan 5, preferably placed in the bottom of the chamber, on which pan is a framework consisting of standards 7 and crossbars 8, preferably made to fit within centering chairs 9 which prevent lateral displacement of the frame 7—8 relative to the mixing pan.

Figure 3:
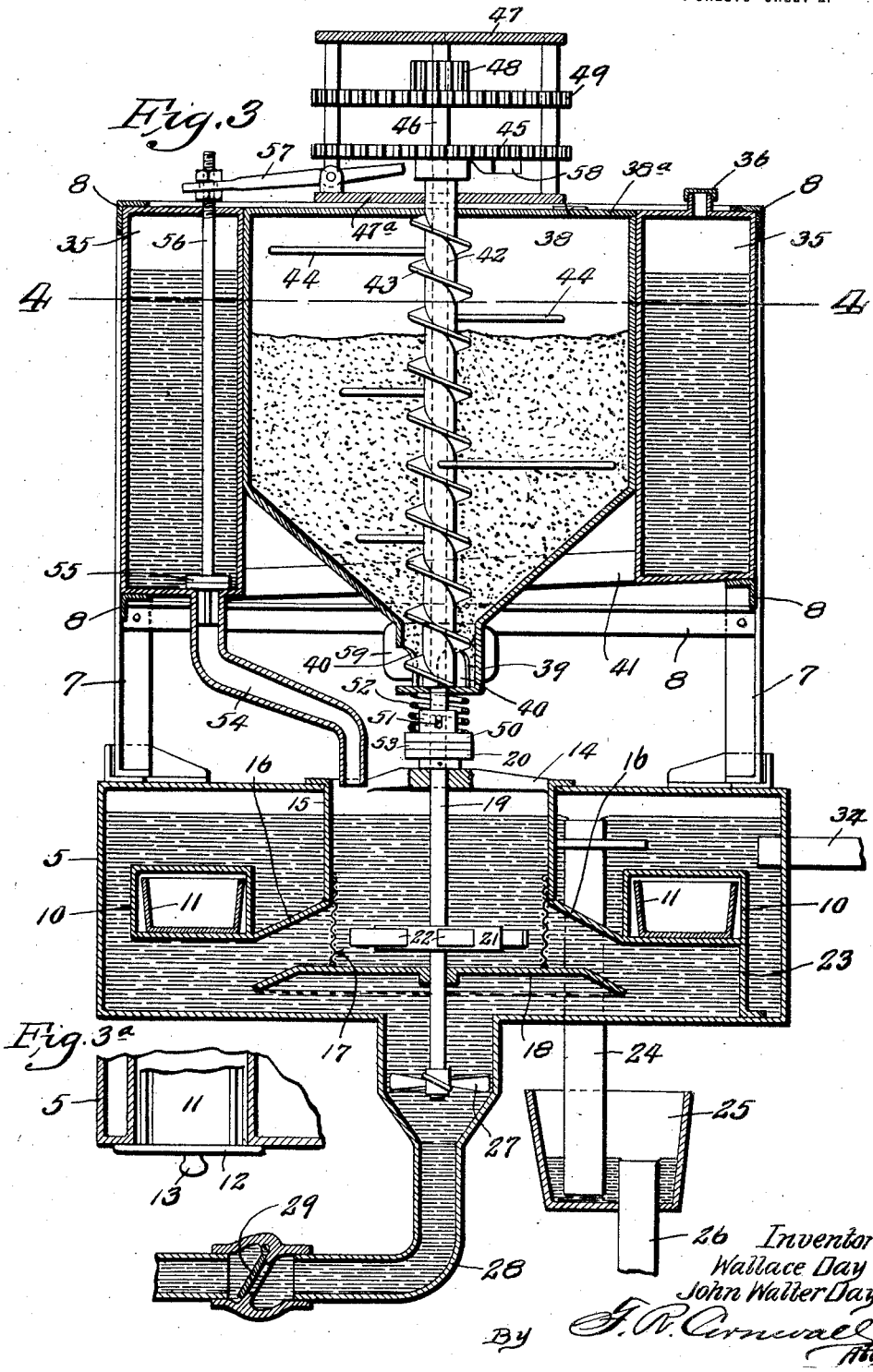
Figure 3 is an enlarged sectional view of the apparatus.

This mixing pan, as shown in Figure 3, is provided with two or more rectangular boxes closed at their rear ends and open at their front ends, said boxes being sealed from the interior of the mixing chamber and containing metal drawers or troughs 11 in which water or other substances may be placed to be frozen. These drawers 11 have front walls 12 which extend over and close the front ends of the open boxes 10, said front walls being provided with handles 13 by which they may be manipulated.

14 indicates a spiderlike flange ring fitting in a central opening in the top wall of a mixing pan 5 and having downwardly extending flanges 15 whose lower ends terminate close to inclined partition walls 16 extending upwardly from the bottom walls of the boxes 10. 17 indicates a cylinder preferably made of wire mesh secured to the lower ends of flanges 15 and resting upon the flanged baffle plates 18, said baffle plates forming a bearing for shaft 19 whose upper end finds a bearing in the spider 14 and is provided with a collar 20 resting upon said spider.

21 indicates a mixing wheel having curved blades 22 extending from its periphery, and which mixing wheel is designed to agitate the water and chemical discharged into the mixing pan within the wire mesh cylinder and form the refrigerating solution. As this mixture is formed by the rotation of the mixing wheel 21, it is thrown outwardly through the wire mesh cylinder and between the baffle plates 16 and 18. In order to prevent the immediate escape of the refrigerating solution, we may provide a blocking-off partition 23 so that the solution will practically have to travel in a circuitous path through the mixing pan before reaching the overflow pipe 24. This overflow pipe leads down into a receptacle 25 forming a liquid seal, from which receptacle leads a waste pipe 26.

27 indicates a propeller located on the lower end of shaft 19 for forcing the refrigerating solution down through pipe 28, preferably having an outwardly opening check valve 29 located near its upper end, said pipe forming a coil 30 whose bottom stretch is provided with a drain cock 31 and is connected to an ascending coil 32 also having a drain cock 33 in its upper stretch, said upper stretch leading into the mixing pan slightly below the level of the refrigerating solution therein by means of a pipe 34. (See Figures 1 and 3).

35 indicates liquid tanks in which water or liquid solution is placed through an opening normally closed by a filling cap 36. For purposes of increasing the capacity of the apparatus and economizing space, there are preferably two of these liquid tanks arranged one on each side of a centrally located and cylindrically shaped chemical container 38, said container preferably having tapered bottom walls terminating in a discharge spout 39 having lateral openings 40 arranged therein. The liquid tanks 35 are connected at their bottoms by means of a connecting pipe 41.

42 indicates a hollow shaft or sleeve carrying spiral blades 43 and curved agitating arms 44. This sleeve extends up through the top wall of the casing and carries a gear 45 at its upper end. The lower end of the sleeve finds a bearing against the bottom wall of the discharge spout 39. When the sleeve is rotated in the proper direction, the agitating arms 44 will tend to loosen up the chemical in the tank, providing the same is in granular or powdered form, and the spiral blade acting as an Archimedean screw will force said chemical down through the discharge spout and out through the lateral openings at the lower end thereof.

46 indicates a shaft finding a bearing in a top plate 47, beneath which top plate said shaft has a pinion 48 and a gear 49 fixed thereto. Shaft 46 extends through the sleeve 42 and below the bottom wall of the discharge spout of the chemical tank, the lower end of said shaft being in alinement with shaft 19 but separated therefrom. 50 indicates a flanged collar mounted for longitudinal movement on shaft 46 by means of a slot and pin connection 51, said flanged collar being normally held downwardly by means of a coiled spring 52.

Referring now to Figure 16, it will be observed that the flanged collars 20 and 50 are provided with transverse slots to cooperate with pins projecting from an interposed disk 53, this slot and pin connection between the shafts 46 and 19 compensating for irregularities in manufacture and permitting the shafts to be slightly out of axial alinement without disturbing their driving connections. It is obvious that any form of universal connection between the shafts 46 and 19 can be employed, but we prefer to use a form which will permit parts to be separated, as when the frame with its water tanks, chemical tank and operating mechanism is removed from the bath pan for purposes of recharging, repairing, etc.

The chemical tank is provided with a charging opening 38$^a$, preferably located in its top wall.

54 indicates a water spout leading from one of the tanks 35 and discharging into and through the central opening in the top wall of the mixing pan. The upper end of this spout is closed by a valve 55 having a stem 56 connected thereto, which stem leads up through the top wall of the tank and is adjustably connected to a lever 57. The inner end of this lever 57 cooperates with a cam projection 58 on the inside of gear 45, so that when gear 45 is being rotated to recharge the mixing bath with a new supply of chemical in the tank 38, the rotation of gear 45 will cause the cam lug 58 to raise the valve 55 and at the same time admit a fresh supply of water or other liquid from tank 35 into the mixing pan. It is obvious that the diameter of the gear 45 and its driving gear or pinion can be so proportioned that any desired number of revolutions, or only a part of a revolution, of the Archimedean screw can be effected according to the chemical used, and also that the cam lug 58 can be made longer or shorter to deliver more or less water or liquid to the mixing pan; or, that two or more cam lugs can be placed on the gear 45 if said gear is driven only a part of a revolution at each charging operation.

Figure 4:
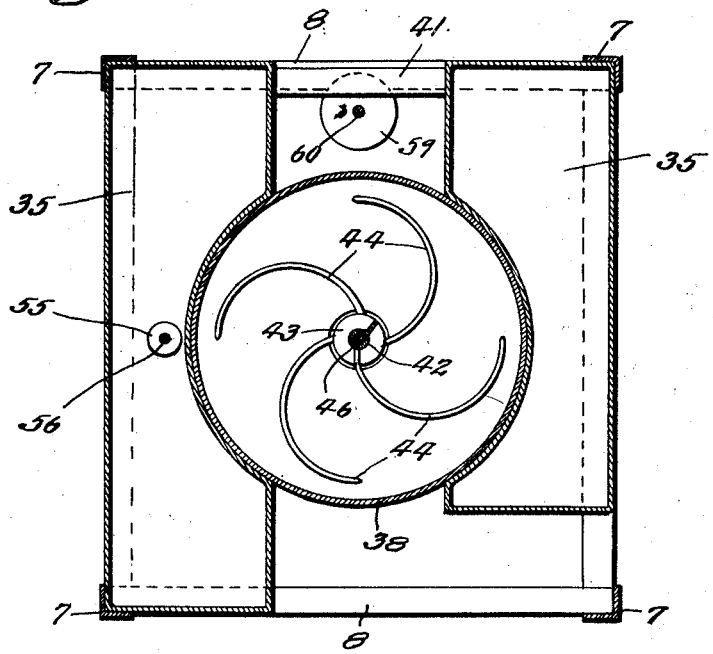
Figure 4 is a horizontal sectional view on line 4—4 of Figure 3.
Figure 5:
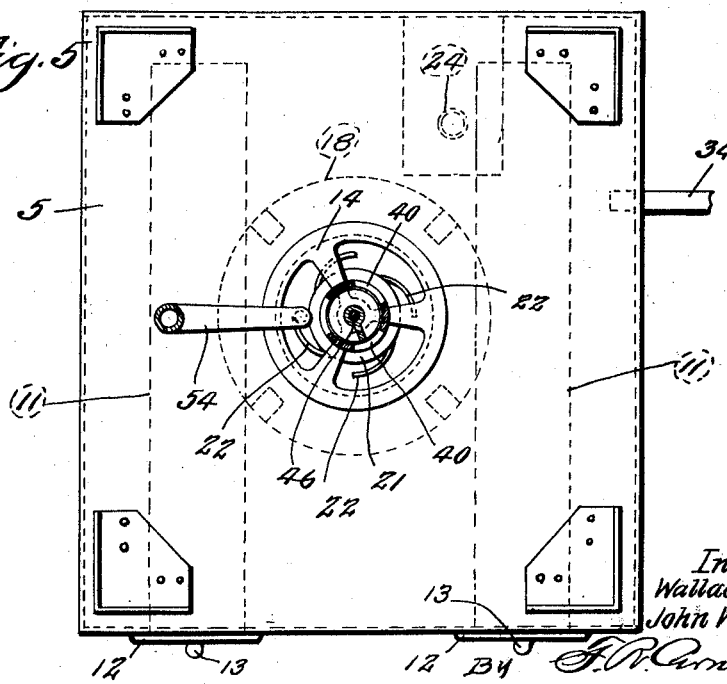
Figure 5 is a plan view of the mixing tank.

Referring to Figures 3 and 4, 59 indicates an electric motor, although a spring motor or a weight could be employed, said motor having a shaft 60 extending up through the gear train plates 47 and 47$^a$ (see Figure 11). 61 indicates a pinion on the motor driven shaft 60 meshing with a gear 62 on shaft 63, said gear 62 in turn meshing with gear 49 on the upper end of shaft 46, before mentioned. Pinion 48, which is conjoined to gear 49, meshes with gear 64 mounted on a shaft 65. Shaft 65 carries a pinion 66 meshing with a gear 67 having a projection 68 on its underside, which projection is designed to cooperate with pins on the periphery of a wheel 69 and intermittently drive said wheel 69.

The train of gears just above described, operated from the motor shaft 60, and up to and including gear 68 will be constantly driven during the operation of the motor, the speed of the motor being reduced by the ratios between the intermeshing gears. The wheel 69 will be intermittently driven. Wheel 69 is mounted on a horizontally disposed shaft 70 carrying a cam 71 at the inner end thereof (see Figures 13 and 14). As this cam intermittently advances in the direction of the arrow, it will in the course of its revolution, and just as it reaches the end of one half of a revolution, raise a flat spring member 72 secured to the bottom of train plate 47 and having an opening which encircles a flanged clutch member 73, pinned or otherwise secured to a companion clutch member 74, which has conjoined thereto a pinion 75 whose upper end is provided with clutching teeth 76. 77 indicates a ratchet toothed clutch member fixed to the shaft 65.

When the motor is energized, the shaft 65 being in the driven train, and its clutch 77 out of engagement with clutch 76, will operate freely until cam 71 lifts the clutch 76 into engagement with 77 whereupon gear wheel 45 will be driven until it makes the desired part or number of revolutions to force a charge of chemicals into the mixing pan and also effecting in such revolution the discharge of a fresh supply of water or liquid into said mixing pan. The intermittent gear 69 will permit the cam 71 to keep the clutch members 76, 77 in engagement during a period of rest of said intermittently driven wheel 69. As shown in the drawings, wheel 69 is provided with nine pins on its periphery, although any number of pins could be employed; but assuming for purposes of illustration that nine pins are used, it is obvious that gear 68 must make nine complete revolutions while the wheel 69 makes one complete revolution. It will also be observed that shaft 46 is rotating continuously at a much higher rate of speed than shaft 65, and, hence, when the motor is energized, shaft 46 will start operating; shaft 70 with the projection on cam 71, located as shown in Figure 13 will travel about one half a revolution (or five pins on wheel 69 will have been engaged and operated) when the projection on cam 71 will engage and lift clutch member 75 into mesh with the driving clutch member 77, and during this engagement between the clutch members, wheel 45 will make one complete revolution. During this revolution of wheel 45, cam projection 58 thereon will engage lever 57 and, through rod 56, lift valve 55, heretofore referred to, and permit water from tank 35 to enter the mixing chamber. When cam projection 58 passes lever 57, valve 55 will close; therefore, the length of cam 58 (see Figure 15) or its speed of movement, determines the amount of water discharged into the mixing chamber and the amount of water thus admitted should be proportionate to the quantity of chemical refrigerant concurrently discharged into said mixing chamber, which, as will be obvious, can be controlled by the number of revolutions imparted to the feed screw 43.

Figure 2:
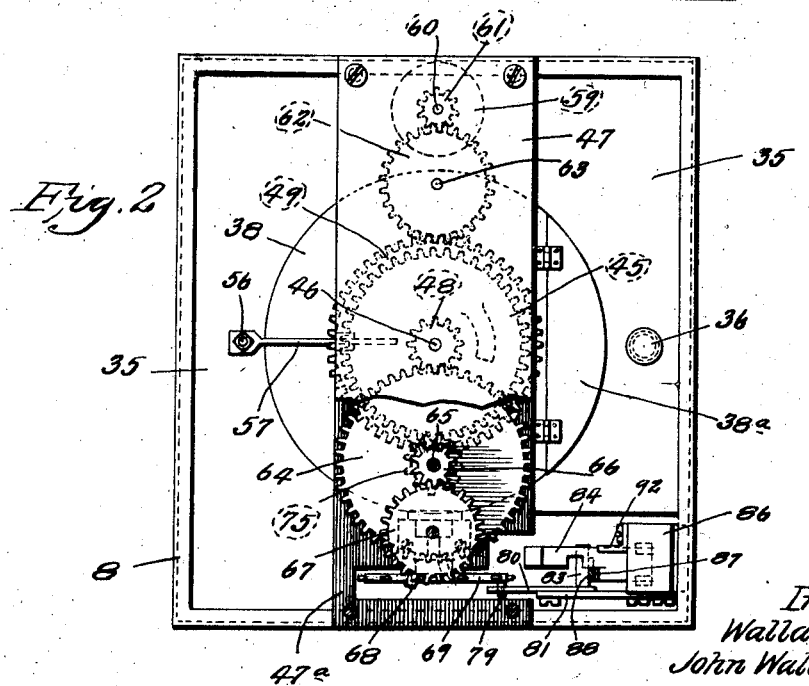
Figure 2 is a top plan view of the apparatus.

79 indicates a pin carried by wheel 69 which is designed to co-operate with a bell-crank lever 80, pivotally mounted in a bracket 82 arranged on one of the frame members (see Figure 2). Bell-crank 80 is caused to be vibrated upon each revolution of wheel 69, and has a projecting finger 82 extending therefrom, and also carries a pin 83 (see Fig. 6) for engaging and lifting a lever 84. This lever 84 is pivoted at 85 to an insulation block 86, secured to an upright frame member 7ª. 86 is a thermostatic bar whose upper free end co-operates with an extension 87, carried by lever 84, and this thermostatic bar also has a contact plate 89 on its upper end which cooperates with a contact point 90 on an adjusting screw 91 secured in a bracket extension 92 to block 86, which block is preferably made of insulation material. The thermostatic bar 88 is mounted on an insulation block 93 secured to the upright 7ª by means of a plate 94 having a binding post 95 to which a wire 96 is connected. Bracket 92 has a binding post 97 to which wire 98 is connected. These wires 96 and 98 lead to the motor, and when contacts 89 and 90 are in engagement, the motor circuit is completed. When said contacts 89, 90 are out of engagement, said motor circuit is broken. Thermostatic bar 88 in addition to its properties of bending and straightening under varying degrees of temperature, also serves as a switch blade, in effect, in making and breaking the motor circuit. Near the upper end of the thermostatic bar is a notch 88ª and in the opposite cooperating edge of lever 84 is a notch 84ª which forms a shoulder 84ᵇ. The outer end of lever 84 is weighted as at 84ᶜ.

In operation, we will assume that the mixing tank 5 is full of water or other liquid; that the tanks 35 are full of water or other liquid; and that the chemical tank 38 is filled with a suitable refrigerating chemical; and that the tappet and thermostatically operated contact making parts are in the position shown in Figures 8 and 8ª. The motor circuit will now be completed and the gear train set in operation with the result that the mixing wheel 21 and the propeller 27 will be driven at a relatively high speed, the former agitating the liquid in the mixing tank and the latter forcing the liquid from said tank through the circulating coils. These coils can, of course, be primed by introducing liquid thereinto through the cock 33 so that the contents of the mixing tank need not be exhausted in this initial operation in filling the coils.

When, in the course of the operation of the mixing wheel and propeller, the cam 71 clutches in sleeve 42, the Archimedean screw will be operated to force down a charge of refrigerating chemical into the mixing tank and the valve 55 will be raised to admit a fresh supply of liquid from tanks 35 into the mixing tank. Then, these liquid and chemical charging devices will be disconnected from the motor driven train of gears, but the motor driven train of gears will continue to operate the mixing wheel 21 and propeller 27 until the wheel 69 has intermittently made a complete revolution, the last one-ninth of which, in the present instance, will engage and operate the tappet 80 and move it from the position shown in Figures 8 and 12 to the position shown in Figure 9. When the pinion 79 approaches the lowermost limit of its final intermittent movement, a detaining and centering spring 99 (see Figure 12) cooperating with the pins on the wheel 69 will force said wheel to complete its revolution, being assisted in this action by the momentum of the armature of the motor in coming to a position of rest when the motor circuit is broken. The pin 83 on the outer end of the tappet 80 being raised will swing in a path or arc of movement intercepted by the thermostatic bar 88, and hence when said pin engages said bar, it will move the bar forwardly so as to break contact between contact plates 89 and 90. When pin 83 is lifted, it will also raise the lever 84 moving the tongue 87 away from the thermostatic bar 88, thus permitting said bar to swing forwardly, and when the pin 83 finally comes to a position of rest, as shown in Figure 9, it will lie against bar 88 which has been placed under tension, and is now under greater tension, the tappet 80 being thus held in a displaced position by friction and because pin 83 lies above what might be designated as the angle of greatest movement between the tappet and the bar 88 within their zone of movement. The motor current now being broken and the bath in the mixing bath having been charged with a refrigerating ingredient, said bath and possibly some of the coils in the circulating pipe, if they have been charged with the refrigerating material, will immediately commence to absorb heat from the chamber or chambers which they occupy with the result that the thermostatic bar 88, as the temperature of its surrounding atmosphere is lowered, will commence to move outwardly, or to the left or leftwardly from the position shown in Figure 9. It will take some little time for the reducing temperature to overcome the tension already placed in bar 88, but assuming that such time has transpired and that bar 88 moves forwardly from the position shown in Figure 9, such leftward movement will eventually release pin 83 and permit the tappet to swing to the position shown in Figure 10, in which it will be seen that pin 83 is swung entirely away and is free from bar 88. Lever 84 has been permitted to drop by this downward movement of pin 83, but said lever cannot follow the pin 83 because its shoulder 84$^b$ strikes on top of the lower edge of the slot 88$^a$ (see Figure 10$^a$). This brings tongue 87 in close proximity to bar 88. As the refrigerating properties of the refrigerant in the mixing pan and coils causes its temperature to rise, i. e., when it has absorbed as many heat units as possible within the range of the surface areas exposed to the chamber being refrigerated, then the thermostatic bar 88 on a rising temperature will start to move in an opposite direction, or towards the right. This rising temperature may be occasioned by the opening of the doors of the refrigerator, or by the continued absorption of the heat units in an endeavor to equalize the temperature of the refrigerant and its containing walls with the surrounding bodies of liquid or atmosphere. In any event, a rising temperature will cause the bar 88 to move rightwardly until the lower edge of its slot will pass beyond the shoulder 84$^b$, when the lever 84 will be permitted to drop to the position shown in Figure 8. In dropping, tongue 87 will move the upper end of bar 88 so that its contact plate 89 will engage the contact point 90 and complete the circuit through the motor. In dropping the lever 84, by virture of its lower curved surface, will engage the pin 83 of the tappet and move it close to the bar 88, as shown in Figure 8, in readiness for another operation. This action of bar 88 in making and breaking the motor circuit is practically that of a snap switch. First, the upper end of bar 88 is quickly and positively moved away from the contact point 90 a sufficient distance to prevent arcing when the motor circuit is broken and bar 88 held under tension until the lowering temperature will cause it to move leftwardly a greater distance so as to release the tappet 80 from its cocked position and place said tappet in position for operation. A rising temperature will cause bar 88 to move in the opposite direction, or rightwardly, in a contact making direction, but this contact is not made nor is the completion of the motor circuit wholly dependent upon a rising temperature because lever 84, having been caught in a half way position when the tappet 80 was released, stands ready when the bar 88 moves rightwardly under a rising temperature to effect a quick snap final movement of the bar the moment that the lever 84 is released by the bar.

When the motor circuit is completed on a rising temperature, as above described, the cycle of operation, as above mentioned is automatically repeated, i. e., a fresh charge of refrigerating chemical is introduced into the mixing pan, and a fresh supply of water or liquid is also introduced into said mixing pan. The refrigerating material will be forced through the coil of pipe and the excess or exhausted refrigerant will overflow into the waste pipe.

We have found that in addition to the nitrate of ammonia before mentioned, calcium chloride can also be used to advantage.

In experiments made with the former, we have determined that a charge of about two pounds introduced into a gallon of water, originally having a temperature of about sixty degrees, will by Fahrenheit thermometric readings reduce the temperature of said water to about six degrees above zero within a space of about three minutes. With this low temperature, a vessel such as the drawers 11 above described practically surrounded by such a refrigerant, if containing water, will freeze as quickly as the heat units originally contained therein can be absorbed therefrom. Of course, different materials have different freezing points, and we have referred to one of them merely as an illustration.

In Figures 17 and 18, we have shown an apparatus in which the mixing pan is not connected to a coil of pipe but may be utilized as a refrigerating unit per se. This mixing pan, instead of having baffle plates, such as shown in Figure 3, may have a wire mesh cylinder 17$^a$ extending throughout its height and within which the mixing wheel 21 operates. The overflow pipe 24$^a$ may discharge directly into the waste pipe 26$^a$, and there is preferably a draining tap 5$^a$ leading from the bottom of the pan in order that the pan may be drained when desired.

What we claim is:

1. A refrigerating system comprising separate containers for a liquid and a chemical, a tank into which said liquid and chemical are discharged to form a refrigerant, and temperature controlled means for effecting said discharge.

2. A refrigerating system comprising separate containers for a liquid and a chemical, a tank into which the said liquid and chemical are discharged to form a refrigerant, means for controlling the amount of said discharge, and temperature controlled means for determining the periodicity of said discharge.

3. A refrigerating system comprising separate containers for a liquid and a chemical, a tank into which the said liquid and chemical are discharged to form a refrigerant, a coil of pipe leading from said tank, and temperature controlled means for forcing the refrigerant from said tank into said coils.

4. A refrigerating system comprising separate containers for a liquid and a chemical, a tank into which the said liquid and chemical are discharged to form a refrigerant, thermostatically controlled means for independently discharging said liquid and said chemical into said tank, a mixing device, and means for operating said mixing device throughout and after the discharging period.

5. A refrigerating system comprising the combination of a frame, separate containers for a liquid and a chemical mounted in said frame, a tank into which the liquid and chemical from said containers may be discharged, said frame being demountable from said tank, mixing means in the tank, independent discharging means on said frame, thermostatically controlled operating mechanism for said discharging means and means for detachably connecting the discharging means with said mixing means.

6. A tank for refrigerating systems comprising cryptal receptacles immersed in a refrigerant in said tank, containers in said receptacles, automatic means for separately introducing and mixing the refrigerant in said tank, and an overflow leading from said tank.

7. A tank for refrigerating systems comprising receptacles immersed in a refrigerant in said tank, containers in said receptacle, thermostatically controlled means for separately discharging a liquid and a chemical into said tank to form the refrigerant, means for mixing the refrigerant in said tank, said mixing means being operable in connection with said discharging means, a coil connected to said tank, vent cocks in the top and bottom stretches of said coil, and means operating in conjunction with said mixing means for forcing the refrigerant from said tank into said coil.

8. In a refrigerating system, the combination of a chemical tank, a liquid tank, a valve for controlling the discharge from said liquid tank, means for discharging a predetermined quantity of chemical from said chemical tank, and thermostatically controlled means for operating said valve in conjunction with said chemical discharging means.

9. In a refrigerating system, the combination of a chemical tank, an Archimedean screw for discharging a predetermined quantity of chemical therefrom, a liquid tank, a valve for controlling the discharge from said liquid tank, thermostatically controlled means for operating said screw at intervals, said means also operating said valve in time relation to said chemical discharging means.

10. In a refrigerating system, the combination of a chemical tank, a liquid tank, thermostatically controlled motor operated means for separately discharging predetermined quantities of the contents of said tanks into a mixing tank, a mixing tank, a wheel which is intermittently driven from the operating mechanism of said discharging means, and devices operated by said intermittent wheel for controlling said motor operated means.

11. A refrigerating system comprising separate containers for a liquid and a chemical, a tank into which said liquid and chemical are discharged to form a refrigerant, mixing means in said tank and motor operated means for effecting said discharge, and operating said mixing means said means including an intermittently operated mechanism, and a thermostat for controlling said motor operated means, said thermostat being partly operated by said intermittently operated mechanism.

In testimony whereof we hereunto affix our signatures this 21st day of February, 1921.

WALLACE DAY.
JOHN WALTER DAY.